United States Patent [19]

Papastavrou

[11] 3,717,980

[45] Feb. 27, 1973

[54] POLLUTION CONTROL APPARATUS

[76] Inventor: Antonios Papastavrou, 2300 W. Chicago Avenue, Chicago, Ill. 60622

[22] Filed: April 27, 1970

[21] Appl. No.: 32,318

[52] U.S. Cl. ..................55/461, 55/DIG. 20, 110/119

[51] Int. Cl. ..............................................B01d 45/00

[58] Field of Search...55/461, 434, DIG. 20; 110/119

[56] References Cited

UNITED STATES PATENTS

| | | | |
|---|---|---|---|
| 169,831 | 11/1875 | Nesmith | 55/DIG. 20 |
| 376,499 | 1/1888 | Ziegler | 55/DIG. 20 |
| 590,033 | 9/1897 | Charlton | 55/461 X |

*Primary Examiner*—Robert L. Lindsay, Jr.

*Attorney*—Alberts, Brezina & Lund

[57] ABSTRACT

Pollution control apparatus in which smoke flows from a chimney through a horizontal pipe section into the side of a generally tubular structure closed at its upper end, thence downwardly through a convergent section and thence upwardly through an exit opening in surrounding relation to the convergent section. A funnel-shaped structure is positioned below the convergent section to receive and direct downwardly traveling particulate matter into the upper end of a relatively thin vertical pipe the lower end of which is coupled to a collection chamber near ground level.

2 Claims, 2 Drawing Figures

18 15 17 16 20 24 22 25 21 23 26 27

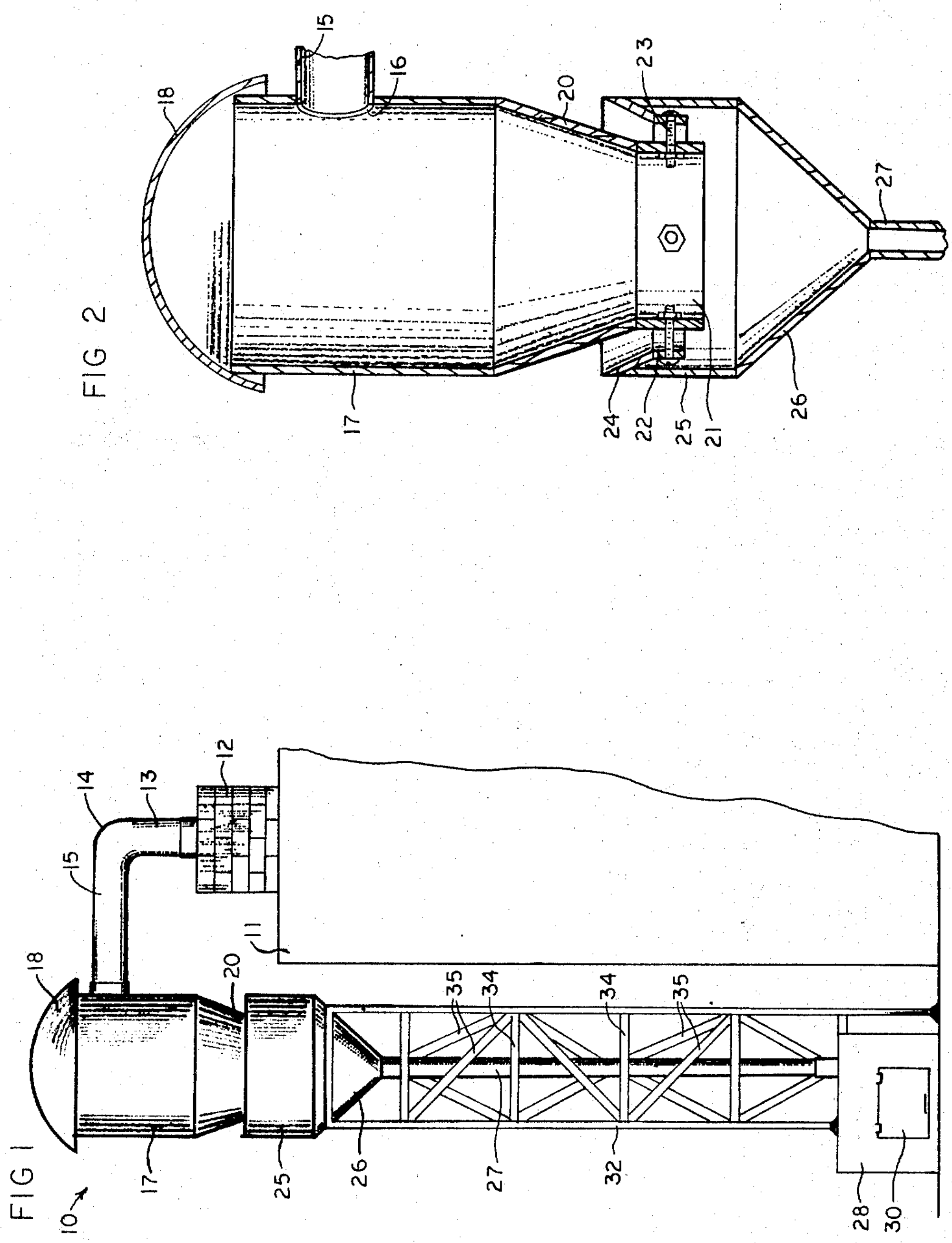
INVENTOR
ANTONIOS PAPASTAVROU
BY Alberts, Brezina & Lund
ATTORNEYS

POLLUTION CONTROL APPARATUS

This invention relates to pollution control apparatus and more particularly to relatively simple and inexpensive apparatus adapted to receive smoke from a chimney and to remove particulate matter therefrom with a high degree of efficiency and without introducing any blocking action which might interfere with the drafts of the chimney.

Various types of apparatus have heretofore been proposed for removing particulate matter from smoke from a chimney including electrostatic precipitators and filter screens or the like. Such types of apparatus have either been quite expensive or have interfered with the draft of the chimney, have been difficult and expensive to maintain and have not always been reliable. The result has been that in spite of the growing seriousness of the problem, comparatively little use has been made of pollution control apparatus.

This invention was evolved with the general object of overcoming the disadvantages of prior types of pollution control apparatus and of providing pollution control apparatus which is simple, inexpensive, reliable, efficient and readily installed and maintained.

According to this invention, smoke from a chimney flows into the entrance of a flow path which has a downwardly extending portion producing a downward velocity of particulate matter in the smoke with an upwardly extending portion between the downwardly extending portion and an exit opening, receiving means being disposed below the downwardly extending portion to receive the particulate matter. With this comparatively simple arrangement, efficient separation is accomplished, the sufficient kinetic energy being imparted to particles in the downward travel thereof to cause the particles to move into the receiving means and to be removed from the smoke.

According to an important feature, pipe means extend downwardly from a point below the downwardly extending portion of the flow path to a collection chamber which may be located at or near ground level, thus facilitating periodic collection of the matter removed from the smoke. Preferably, the pipe means has a cross-sectional area equal to a small fraction of the cross-sectional area of the downwardly extending portion of the flow path and the collection chamber is closed to minimize any possible updraft through the pipe means which might interfere with the travel of particles to the collection chamber.

According to a specific feature, funnel-shaped wall means are provided below the downwardly extending portion of the flow path for directing particulate matter into the upper end of the pipe means.

According to another feature of the invention, the downwardly extending portion of the flow path is defined at least in part by a convergent section which serves to increase the downward velocity of particles and to thus obtain more efficient separation.

The downwardly extending portion of the flow path is preferably defined by tubular means located in horizontally spaced generally parallel relation to the chimney with a pipe extending horizontally from the side of the tubular means and to the upper end of the chimney. A second tubular means is disclosed in spaced surrounding relation to a lower end portion of the first tubular means and cooperates therewith to define a generally annular exit opening.

According to another important feature, the downwardly extending portion of the flow path has a cross-sectional area substantially greater than that of the chimney which achieves two important advantages. First, the overall rate of flow is reduced to minimize turbulence while still producing a downward velocity of particles such as to obtain a smooth separating action. Secondly, the external dimensions of the apparatus is increased at the exit opening and in flowing past the apparatus, the velocity of air flowing in response to wind currents is increased to obtain a suction effect at the exit opening and continuous flow through the apparatus. As a result, there is no adverse effect on the draft of the chimney.

This invention contemplates other objects, features and advantages which will become more fully apparent from the following detailed description taken in conjunction with the accompanying drawings which illustrate a preferred embodiment and in which:

FIG. 1 is a side elevational view of pollution control apparatus according to the invention, shown connected to the upper end of a chimney; and FIG. 2 is a cross-sectional view, on an enlarged scale, showing details of construction of a main portion of the apparatus.

Reference numeral 10 generally designates pollution control apparatus constructed in accordance with the principles of this invention, shown associated with a building 11 having a chimney 12.

Smoke from the chimney 12 flows into the lower end of a vertical portion 13 of a generally L-shaped pipe 14 having a horizontally extending portion 15 the end of which is coupled to an opening 16 in the wall of a tubular member 17, which may preferably be cylindrical. The member 17 is closed at its upper end by a cap member 18 which may preferably be generally semispherical or dome-shaped as shown. The lower end of the member 17 is connected to the upper end of a member 20 which may preferably be of frusto-conical shape and which defines a convergent section. The lower end of the member 20, in turn, is connected to the upper end of a short tubular member 21 which is preferably cylindrical. The members 17, 20 and 21 are so joined, as by welding, to provide sealed connections therebetween, or, if desired, they can be formed from a single member of sheet metal having a vertical seam.

The member 21 is supported in concentric relation within a member 22 by means of suitable screws or bolts 23. A member 24 is secured to the upper end of the member 22 and has a generally frusto-conical shape, an upper end portion of the member 24 being secured on the upper end of a tubular member 25. The lower end of the member 25 is secured to the upper end of a funnel member 26 the lower end of which is secured to the upper end of a pipe 27. The lower end of the pipe 27 is coupled to an enclosure 28 which forms a collection chamber and which has a door 30 for removal of collected particulate matter. Preferably, a seal is provided between door 30 and the opening in the enclosure 28, to prevent entrance of air except when the door 30 is opened. Enclosure 28 is shown resting on the ground and in any case may preferably be near ground level, for ready removal of collected particulate matter. A framework 32 is provided for supporting the member 26 from the enclosure 28 and from the ground. The framework 33 may preferably include three vertical members 33, a series of vertically spaced horizontal braces 34 and a series of angle braces 35.

In the operation of the apparatus, smoke travels through the pipe 14 into the member 17 thence downwardly through members 20 and 21 into the space between the lower end of member 21 and the funnel member 26, thence upwardly between the outer surface of member 21 and the inner surface of member 22 and thence upwardly between the outer surface of the member 20 and the inner surface of the member 24 to the atmosphere. Members 17, 20 and 21 thus define a path for downward movement and in moving through this path, particles in the smoke acquire a downward velocity and a certain kinetic energy which causes them to move toward the funnel member 26 to be directed into the upper end of the pipe 27 and to move downwardly through the pipe 27 to the enclosure 28.

The convergent section 20 is important in that it causes an increase in the velocity of flow and a corresponding increase in the kinetic energy of the particles to prevent the particles from moving upwardly and out into the atmosphere.

As above noted, a sealed connection is preferably provided between the door 30 and the enclosure 28 and the pipe 27 preferably has a cross-sectional area equal to a small fraction of the cross-sectional area of the members 17, 20 and 21, which serves to minimize any updraft in the pipe 27 which might interfere with the separation and removal operation.

The cross-sectional area of the downward flow portion of the flow path, even at the most restricted portion thereof, within member 21, is preferably substantially larger than the cross-sectional area of the flow path in the chimney 12. Preferably, there may be a ratio on the order of 3 or 4 or more. This has important advantages, as pointed out previously.

I claim as my invention:

1. In pollution control apparatus for removing particulate matter from smoke from a chimney, flow path means having entrance and exit openings and defining a flow path between said openings, said entrance opening being adapted to be coupled to the upper end of a chimney, said flow path including a downwardly extending portion producing a downward velocity of particles in the smoke and having an upwardly extending portion between said downwardly extending portion and said exit opening, receiving means disposed below said downwardly extending portion for receiving particulate matter, the lower end of said downwardly extending portion of said flow path having a cross-sectional area less than that of the upper end thereof, and a convergent section between said upper and lower ends of said downwardly extending portion, said flow path means comprising a generally tubular member having a generally vertical axis and defining an upper part of said downwardly extending portion, and a generally frusto-conical hollow member defining said convergent section, said hollow member having an upper end joined to the lower end of said tubular member and having a lower end of substantially reduced cross-sectional area, said flow path means further comprising a second generally tubular member having an upper end joined to the lower end of said generally frusto-conical hollow member, and a third generally tubular member in coaxial relation to and spaced outside said second generally tubular member to define part of said upwardly extending portion of said flow path.

2. In apparatus as defined in claim 1, a funnel-shaped member having an upper end joined to the lower end of said third generally tubular member and arranged to direct particulate matter into said receiving means.

* * * * *